United States Patent
Petrov et al.

(10) Patent No.: US 9,311,299 B1
(45) Date of Patent: Apr. 12, 2016

(54) WEAKLY SUPERVISED PART-OF-SPEECH TAGGING WITH COUPLED TOKEN AND TYPE CONSTRAINTS

(71) Applicant: Google Inc., Mountain View, CA (US)

(72) Inventors: Slav Petrov, New York, NY (US);
Dipanjan Das, Jersey City, NJ (US);
Ryan McDonald, New York, NY (US);
Joakim Nivre, Uppsala (SE); Oscar Tackstrom, Bromma (SE)

(73) Assignee: Google Inc., Mountain View, CA (US)

( * ) Notice: Subject to any disclaimer, the term of this patent is extended or adjusted under 35 U.S.C. 154(b) by 318 days.

(21) Appl. No.: 13/955,491

(22) Filed: Jul. 31, 2013

(51) Int. Cl.
*G06F 17/28* (2006.01)
*G06F 17/27* (2006.01)

(52) U.S. Cl.
CPC ............ *G06F 17/28* (2013.01); *G06F 17/2785* (2013.01)

(58) Field of Classification Search
CPC .... G06F 17/28; G06F 17/2785; G06F 17/271
USPC .......................................................... 704/9
See application file for complete search history.

(56) References Cited

U.S. PATENT DOCUMENTS 5,146,405 A * 9/1992 Church ............... G06F 17/271
700/90
8,560,477 B1 * 10/2013 Petrov ................. G06N 99/005
706/46

2009/0089058 A1 * 4/2009 Bellegarda ............ G06F 17/277
704/251

OTHER PUBLICATIONS

Das et al.,"Unsupervised Part-of-Speech Tagging with Bilingual Graph-Based Projections", In Proceedings of ACL-HLT, 2011, 10 pages.
Garrette et al.,"Learning a Part-of-Speech Tagger from Two Hours of Annotation", The University of Texas at Austin, 2013, Retrieved on Apr. 10, 2013 from http://www.cs.utexas.edu/users/dhg/papers/garrette_baldridge_naacl2013.pdf, Apr. 10, 2013, 10 pages.
Lee et al.,"Simple Type-Level Unsupervised POS Tagging", EMNLP '10 Proceedings of the 2010 Conference on Empirical Methods in Natural Language Processing; pp. 853-861, Oct. 11, 2010.
Li et al.,"Wiki-ly Supervised Part-of-Speech Tagging", In Proceedings of EMNLP-CoNLL, 2012, 10 pages.

(Continued)

*Primary Examiner* — Lamont Spooner
*Assistant Examiner* — Oluwadamilola M Ogunbiyi
(74) *Attorney, Agent, or Firm* — Fish & Richardson P.C.

(57) ABSTRACT

A method and system are provided for a part-of-speech tagger that may be particularly useful for resource-poor languages. Use of manually constructed tag dictionaries from dictionaries via bitext can be used as type constraints to overcome the scarcity of annotated data in some instances. Additional token constraints can be projected from a resource-rich source language via word-aligned bitext. Several example models are provided to demonstrate this such as a partially observed conditional random field model, where coupled token and type constraints may provide a partial signal for training. The disclosed method achieves a significant relative error reduction over the prior state of the art.

20 Claims, 9 Drawing Sheets

(56) References Cited

OTHER PUBLICATIONS

Tackstrom et al.,"Token and Type Constraints for Cross-Lingual Part-of-Speech Tagging", Google Research, 2013, Retrieved on Apr. 10, 2013 from http://static.googleusercontent.com/external_content/untrusted_dlcp/research.google.com/en/us/pubs/archive/40758.pdf, Apr. 10, 2013, 12 pages.

Yarowsky et al.,"Inducing Multilingual POS Taggers and NP Bracketers via Robust Projection across Aligned Corpora", In Proceedings of NAACL, 2001, 8 pages.

\* cited by examiner

FIG. 5

| 510 | Er | das | Buch | gelesen |
| --- | --- | --- | --- | --- |
| 520 | PRON | DET | NOUN | VERB |
| 530 | He | read | the | book |

| 540 | PRON | VERB | DET | NOUN, ADJ |
| --- | --- | --- | --- | --- |

| 550 | PRON | NOUN, VERB | | NOUN, VERB |
| --- | --- | --- | --- | --- |

FIG. 9

| Lang. | Prior work | | HMM with type constraints | | | |
|---|---|---|---|---|---|---|
| | PW1 | PW2 | $y_{proj.}^{HMM}$ | $y_{wik.}^{HMM}$ | $y_{union}^{HMM}$ | $y_{union}^{HMM}$+C |
| bg | – | – | 84.2 | 68.1 | 87.2 | 87.9 |
| cs | – | – | 75.4 | 70.2 | 75.4 | 79.2 |
| da | 83.2 | 83.3 | 87.7 | 82.0 | 78.4 | 89.5 |
| de | 82.8 | 85.8 | 86.6 | 85.1 | 80.0 | 88.3 |
| el | 82.5 | 79.2 | 83.3 | 83.8 | 86.0 | 83.2 |
| es | 84.2 | 86.4 | 83.9 | 83.7 | 88.3 | 87.3 |
| fr | – | – | 88.4 | 75.7 | 75.6 | 86.6 |
| it | 86.8 | 86.5 | 89.0 | 85.4 | 89.9 | 90.6 |
| ja | – | – | 45.2 | 76.9 | 74.4 | 73.7 |
| nl | 79.5 | 86.3 | 81.7 | 79.1 | 83.8 | 82.7 |
| pt | 87.9 | 84.5 | 86.7 | 79.0 | 83.8 | 90.4 |
| sl | – | – | 78.7 | 64.8 | 82.8 | 83.4 |
| sv | 80.5 | 86.1 | 80.6 | 85.9 | 85.9 | 86.7 |
| tr | – | – | 66.2 | 44.1 | 65.1 | 65.7 |
| zh | – | – | 59.2 | 73.9 | 63.2 | 73.0 |
| avg (8) | 83.4 | 84.8 | 84.9 | 83.0 | 84.5 | 87.3 |
| avg | – | – | 78.5 | 75.9 | 80.0 | 83.2 |

FIG. 10

| Lang. | Token constraints | | | HMM with coupled constraints | | | | CRF with coupled constraints | | | |
|---|---|---|---|---|---|---|---|---|---|---|---|
| | $y^{HMM}_{union}$+C+L | $y^{HMM}_{proj}$+C+L | $y^{CRF}$+C+L | $y^{HMM}_{proj}$+C+L | $y^{HMM}_{with.}$+C+L | $y^{HMM}_{union}$+C+L | | $y^{CRF}_{proj}$+C+L | $y^{CRF}_{with.}$+C+L | $y^{CRF}_{union}$+C+L | |
| bg | 87.7 | 77.9 | 84.1 | 84.5 | 83.9 | 86.7 | | 86.0 | 87.8 | 87.4 | |
| cs | 78.3 | 65.4 | 74.9 | 74.8 | 81.1 | 76.9 | | 74.7 | 80.3** | 75.0 | |
| da | 82.3 | 80.9 | 85.1 | 87.2 | 85.6 | 88.1 | | 85.5 | 88.2* | 86.0 | |
| de | 87.7 | 81.4 | 83.3 | 85.0 | 89.3 | 86.7 | | 84.4 | 90.5** | 85.5 | |
| el | 85.9 | 81.1 | 77.8 | 80.1 | 87.0 | 83.9 | | 79.6 | 89.5** | 79.7 | |
| es | 80.1** | 84.1 | 85.5 | 83.7 | 85.9 | 88.0 | | 85.7 | 87.1 | 86.0 | |
| fr | 88.4** | 83.5 | 84.7 | 85.9 | 86.4 | 87.4 | | 84.9 | 87.2 | 85.6 | |
| it | 89.6 | 85.2 | 88.5 | 88.7 | 87.6 | 89.8 | | 88.3 | 89.3 | 80.4 | |
| ja | 72.8 | 47.6 | 54.2 | 43.2 | 76.1 | 70.5 | | 44.9 | 81.0*** | 68.0 | |
| nl | 83.1 | 78.4 | 82.4 | 82.3 | 84.2 | 83.2 | | 83.1 | 85.9*** | 83.2 | |
| pt | 89.1 | 84.7 | 87.0 | 86.6 | 88.7 | 88.0 | | 87.9 | 91.0*** | 88.3 | |
| sl | 82.4 | 69.8 | 78.2 | 78.5 | 81.8 | 80.1 | | 79.7 | 82.3 | 80.0 | |
| sv | 86.1 | 80.1 | 84.2 | 82.3 | 87.0 | 86.9 | | 84.4 | 88.9** | 85.5 | |
| tr | 62.4 | 58.1 | 64.5 | 64.6 | 61.8 | 64.8 | | 65.0 | 64.1*** | 65.2 | |
| zh | 72.6 | 52.7 | 59.5 | 56.0 | 74.1 | 73.3 | | 59.7 | 74.4*** | 73.4 | |
| avg (8) | 87.2 | 82.0 | 84.2 | 84.5 | 87.0 | 86.8 | | 84.9 | 88.8 | 85.4 | |
| avg | 82.8 | 74.1 | 76.9 | 77.6 | 82.8 | 82.3 | | 78.2 | 84.5 | 81.1 | |

WEAKLY SUPERVISED PART-OF-SPEECH TAGGING WITH COUPLED TOKEN AND TYPE CONSTRAINTS

BACKGROUND

Supervised part-of-speech ("POS") taggers are available for more than twenty languages and achieve accuracies of around 95% on in-domain data. Supervised taggers are routinely employed in many natural language processing ("NLP") applications, such as syntactic and semantic parsing, named-entity recognition, and machine translation. Unfortunately, the resources required to train supervised taggers are expensive to create and unlikely to exist for the majority of written languages. The necessity of building NLP tools for these resource-poor languages has been part of the motivation for research on unsupervised learning of POS taggers.

Recently, learning POS taggers with type-level tag dictionary constraints have gained popularity. Tag dictionaries, noisily projected via word-aligned bitext have bridged the gap between purely unsupervised and fully supervised taggers, resulting in an average accuracy of over 83% on a benchmark of eight Indo-European languages. A further improvement employs a tag dictionary source, resulting in the hitherto best published result of almost 85% on the same setup.

BRIEF SUMMARY

According to an implementation of the disclosed subject matter, at least one test word in a first language may be received. Token level data for the at least one test word may be obtained. The token level data may be associated with the at least one test word in the first language. Type level data may be obtained for the at least one test word. The type level data may be associated with the at least one test word in the first language. A POS tagger algorithm may be trained based on the token level data and the type level data. A sentence may be received in the first language. The trained POS tagger algorithm may be applied to the sentence to determine a tag for one or more words in the sentence. The tagged one or more words in the sentence may be provided.

Training the POS algorithm for the at least one test word in the first language may include allowing a first tag set for each token level data whose type level data is not in a tag dictionary. A second tag set may be pruned. The second tag set may include token level data that is present in the type level data. The step of pruning may refer to removing any tag from the second tag set for the at least one test word that does not appear in the tag dictionary. A bidirectional word alignment may be generated based on the first tag set and the second tag set. A tag for the at least one test word in the first language may be projected using the bidirectional word alignment. Any unprojected tag in the bidirectional word alignment may be pruned. In some configurations, any projected tag that is not present in the bidirectional word alignment may be ignored.

A system is disclosed that includes a database for storing type level data and a processor connected to the database. The processor may be configured to receive at least one test word in a first language. It may obtain token level data for the at least one test word and associate the token level data with the at least one test word in the first language. The processor may be configured to obtain type level data for the at least one test word and associate the type level data with the at least one test word in the first language. It may train a part-of-speech tagger algorithm based on the token level data and the type level data.

The disclosed methods and systems herein may provide words more accurately tagged for their parts of speech. Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIG. 5 is an example POS tagging according to an implementation disclosed herein.

FIG. 9 is a table that shows the tagging accuracies for the models tested according to an implementation disclosed herein.

FIG. 10 is a table that shows tagging accuracies for models with token constraints and coupled token and type constraints.

DETAILED DESCRIPTION

Figure 1:
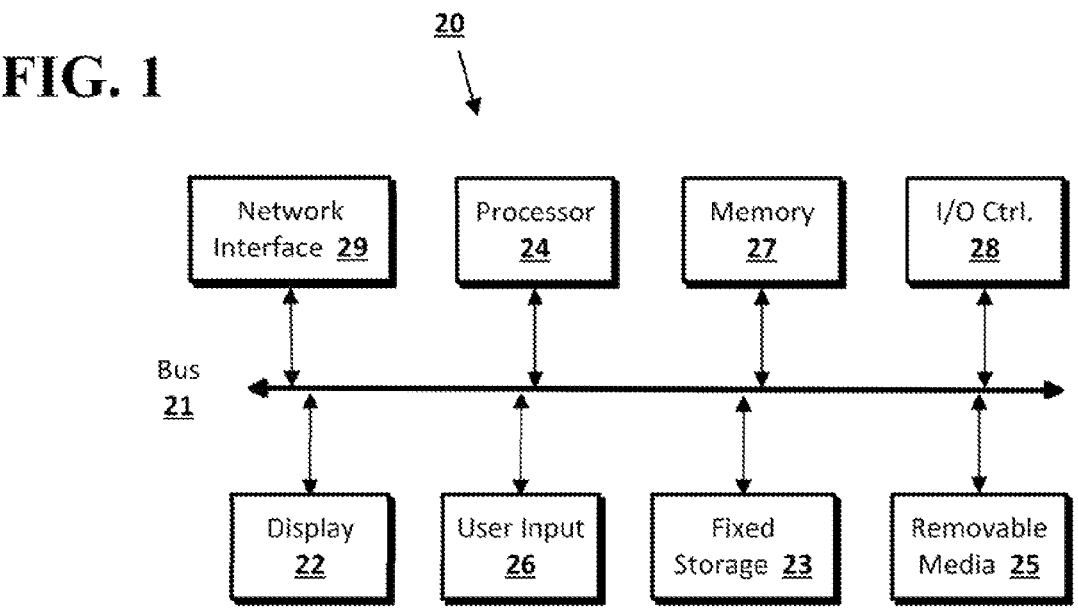
FIG. 1 shows a computer according to an implementation of the disclosed subject matter.

Given a tag dictionary, even if it is incomplete, it is possible to train an accurate part-of-speech ("POS") tagger. Such an approach may achieve excellent results. However, it typically is necessary to use tag dictionaries extracted directly from the underlying treebank data. Treebank data may refer to a text corpus in which each sentence has been parsed (i.e., annotated with syntactic structure). Such dictionaries may provide in-depth coverage of the test domain and also list all inflected forms of items included in the tag dictionary. Further, such resources often are difficult to obtain and, realistically, often may be unavailable for resource-poor languages.

In contrast, type-level tag dictionaries may be generated automatically by aggregating over projected token-level information extracted from bitext. To handle the noise in these automatic dictionaries, label propagation may be used on a similarity graph to smooth (and also expand) the label distributions. While this approach produces good results and is applicable to resource-poor languages, it requires a complex multi-stage training procedure including the construction of a large distributional similarity graph. While noisy and sparse in nature, tag dictionaries are available for almost 200 languages. Furthermore, the quality and coverage of these dictionaries is growing continuously. Type constraints from a tag dictionary may be incorporated into a feature-based Hidden Markov Model ("HMM") for improved results.

Methods and systems are disclosed for coupling token and type level data to build robust POS taggers that do not require any direct human supervision in the target language. A POS tag may refer to an identification of at least one function of a word (e.g., noun, verb, adjective, adverb, article, etc.). Although the aforementioned weakly supervised approaches have resulted in significant improvements over fully unsupervised approaches, they have not exploited the benefits of token-level cross-lingual projection methods, which are possible with word-aligned bitext between a target language of interest and a resource-rich source language, such as English.

While prior work has successfully considered both token- and type-level projection across word-aligned bitext for estimating the model parameters of generative tagging models, a key observation underlying the present disclosure is that token- and type-level information offer different and complementary signals. On the one hand, high confidence token-level projections offer precise constraints on a tag in a particular context. On the other hand, manually created type-level dictionaries can have broad coverage and do not suffer from word-alignment errors; they can therefore be used to filter systematic as well as random noise in token-level projections.

In order to reap these potential benefits, a partially observed conditional random field ("CRF") model is provided that couples token and type constraints in order to guide learning. In essence, the model is given the freedom to push probability mass towards hypotheses consistent with both types of information. Noisy projected or manually constructed dictionaries may be used according to the implementations disclosed herein to generate type constraints. In addition to standard (contextual) lexical features and transition features, adding features from a monolingual word clustering can significantly improve accuracy. While most of these features can also be used in a generative feature-based hidden Markov model ("HMM"), accuracy may be improved with a globally normalized discriminative CRF model as disclosed herein.

Implementations of the presently disclosed subject matter may be implemented in and used with a variety of component and network architectures. FIG. 1 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
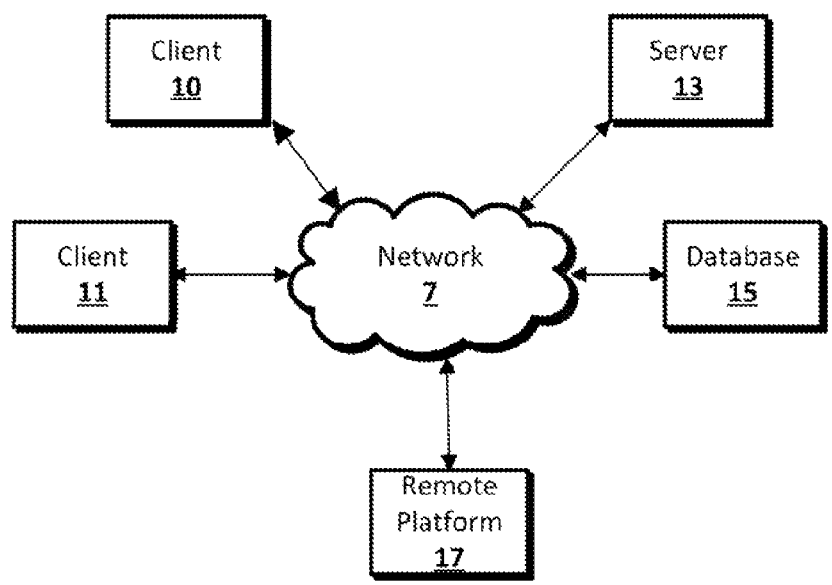
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

For a majority of resource-poor languages, at least some bitext exists with a resource-rich source language. A bitext may refer to a word alignment between two languages (e.g., between a resource-poor language and a resource-rich language). An example of a resource-rich language is English. In the examples described below, it is utilized as the source language. Other examples of factors that make a language resource-rich may include the presence of one or more of the following: an annotated corpus, a dictionary, and a translation text (e.g., where the resource rich language is translated/aligned with another language). Examples of resource rich languages may include Hindi, French, German, and Russian. Examples of resource poor languages may include Assamese, Gujarati, Maithili, Oriya, Rajasthani, Punjabi, and Santali. Some languages may be difficult to characterize as resource-rich or -poor. In such instances, they may be deemed as a resource-poor language.

Using English as a resource rich language, a supervised POS tagger may be used to predict POS tags for the English side of a bitext. These predicted tags can be projected subsequently to the target side via automatic word alignments. However, due to the automatic nature of the word alignments and the POS tags, there may be significant noise in the projected tags. As disclosed, both CRF and HMM based models may be utilized to perform a POS tagging. Smoothing techniques may be employed when training a HMM to mitigate the noise. Noise may be mitigated by combining projections from multiple source languages to filter out random projection noise as well as the systematic noise arising from different source language annotations and syntactic divergences.

Figure 3:
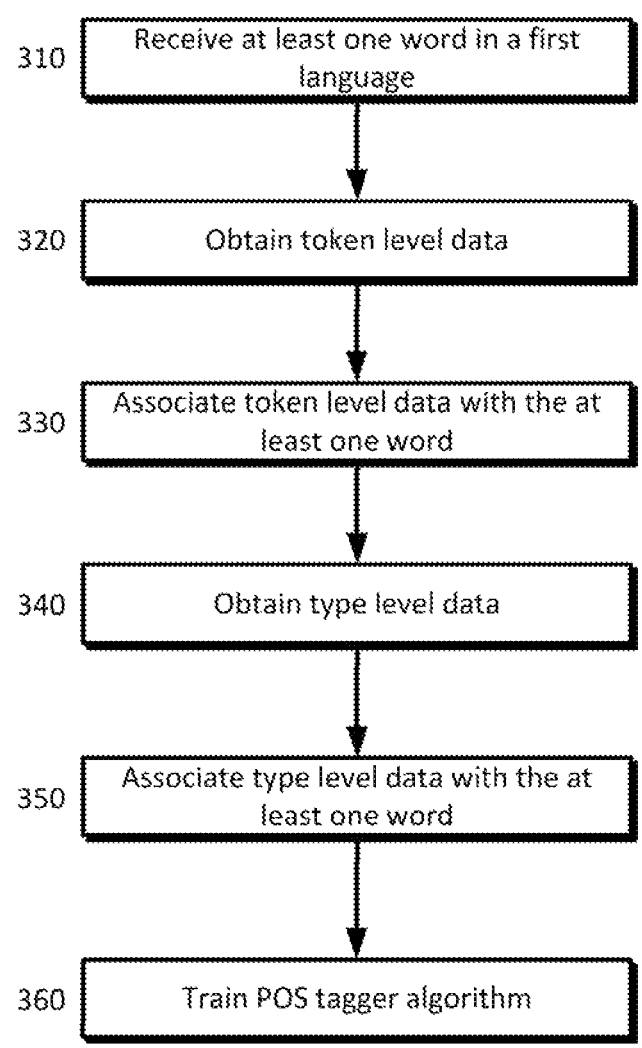
FIG. 3 shows an example process for training a POS tagger algorithm according to an implementation disclosed herein.
Figure 4:
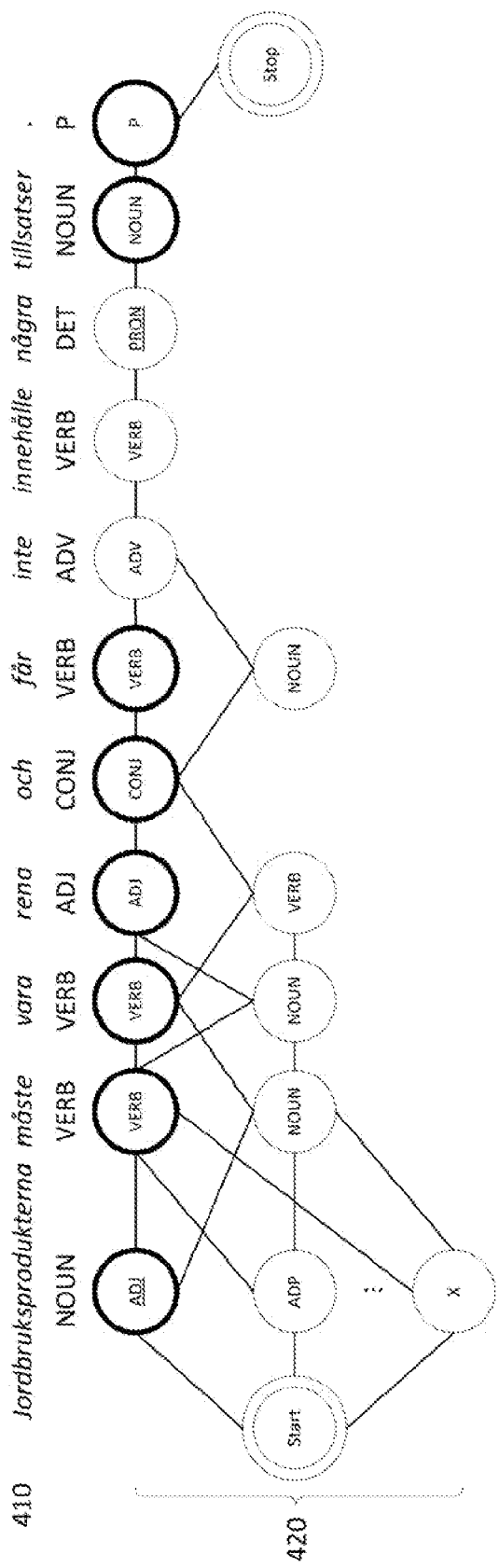
FIG. 4 is an example lattice representation of an inference search space Y(x) for a sentence after pruning with tag dictionary type constraints according to an implementation disclosed herein.

In an implementation, an example of which is provided in FIG. 3, at least one test word in a first language may be received at 310. The first language may be a resource poor language as described above. The at least one test word may be received as one or more sentences or phrases in the first language. Phrases and/or sentences may enable collection of token level data. Token level data (e.g., a token constraint) for the at least one test word may be obtained at 320. Token level data may refer to a tag associated with a word as it may be used in a particular context. For example, in the sentence, "Kate read the book," the word "book" is used as a noun. The token level data may completely disambiguate a particular token (e.g., word) as it is used in a sentence. However, it may not indicate other possible uses of the word. Thus it may be beneficial to combine token level data with type level data, as discussed below. In some configurations, the token level data may refer to a linkage between a second language (e.g., English) that has been tagged for POS and the first language. In the example sentence used above, the word "book" may be tagged in a resource rich language such as English as a noun (e.g., based on a translation of the sentence from the first language to the English language). A linkage may be represented in the form of a lattice as shown in FIG. 4 and discussed below.

The token level data may be associated with the at least one test word in the first language at 330. For example, a table may be generated and stored that associates a particular word in the first language with a particular POS tag based on the token level data. Type level data (e.g., a type constraint) for the at least one test word may be obtained at 340. Type level data may refer to data about a particular word as obtained from a tag dictionary. A tag dictionary may refer to any collection of words in which at least one word has one or more POS tags associated with it. For example, many online or print dictionaries identify a POS tag for the word as a component of a definition (e.g., an annotated dictionary entry). The type level data may be associated with the at least one test word in the first language at 350. For example, a database table may be generated that contains the word in the first language and the one or more type level data obtained from the tag dictionary. A POS tagger algorithm may be trained based on the token level data and the type level data at 360. Training the POS tagger algorithm is discussed in further detail below.

The disclosed approach complements token- and type-level data with one another during training of a POS tagger. A training set may include, for example, one or more training words for which a POS tag is known, and/or for which token and/or type level data are known or available. For each of at least one word in the training set, a partially constrained lattice of tag sequences may be constructed as follows:

1. For each token having a type not in the tag dictionary, a complete tag set may be allowed for potential matches to the training word (i.e., a first tag set is allowed for each token level data whose type level data is not in the tag dictionary).
2. For each token whose type is in the tag dictionary, all tags that do not appear in the dictionary may be pruned and the token may be marked as dictionary-pruned. For example, a second tag set may be pruned; the second tag set may be token level data that is present in the type level data (e.g., where token and type level data exists for the at least one word). The pruning function may refer to the removal of any tag from the second tag set for the at least one test word that does not appear in the tag dictionary. For example, a word may have multiple tags associated with it based on the token level data. Some of the tags associated with the word may not appear in the tag dictionary. Those tags may be removed or pruned.
3. A bidirectional word alignment based on the first tag set and the second tag set may be generated. A tag may be projected for the at least one test word in the first language utilizing the bidirectional word alignment. For each token that has a tag projected via a high-confidence bidirectional word alignment: if the projected tag is still present in the lattice, then every tag may be pruned but the projected tag for that token; if the projected tag is not present in the lattice, which can only happen for dictionary-pruned tokens, then the projected tag may be ignored.

FIG. 4 provides an example of the logic disclosed above as applied to a Swedish sentence 410. It shows a lattice representation 420 of an inference search space Y(x) for a sentence in Swedish (which translates in English to, "The farming products must be pure and must not contain any additives.") after pruning with tag dictionary type constraints according to an implementation disclosed herein. The correct parts of speech are listed underneath each word. Bold nodes show projected token constraints ỹ. Underlined text indicates incorrect tags. The coupled constraints lattice Ŷ(x, ỹ) consists of the bold nodes together with nodes for words that are lacking token constraints; in this case, the coupled constraints lattice thus defines exactly one valid path.

The lattice 420 shows tags permitted after constraining the words to tags that appear in the dictionary (up until Step 2 from above). There is only a single token "Jordbruksprodukterna" (which translates in English to, "the farming products") not in the dictionary; in this case the lattice 420 permits the full set of tags. With token-level projections (e.g., Step 3, nodes with bold border in FIG. 4), the lattice can be further pruned. In most cases, the projected tag is both correct and is in the dictionary-pruned lattice. Thus, such tokens may be disambiguated successfully and substantially shrink the search space.

In some instances, the model may not adequately tag a POS. For example, for the token "Jordbruksprodukterna," the erroneously projected tag "ADJ" may eliminate all other tags from the lattice, including the correct tag "NOUN." That is, in the example shown in FIG. 4, "ADJ" was predicted from the token level data. Based on step 1 of the logic described above, the projected token tag would be accepted if there was not type level data. The token "några" (which translates in English to "any") has a single dictionary entry "PRON" and is missing the correct tag "DET." In the case where "DET" is the projected tag, it may not be added to the lattice 420 and may be ignored. This occurs because "DET" (the correct tag) may be predicted by the model; but, it may not be added because "DET" does not appear in the tag dictionary. The tag dictionary has an entry for this word (See step 2 of the logic disclosed earlier). In such cases, the tag dictionary can be trusted more than the tags projected via noisy word alignments. Taking the union of tags may cause the POS tagger algorithm to perform worse.

FIG. 5 provides an example POS tagging according to an implementation disclosed herein. The token- and type-data are hypothetical and do not necessarily reflect a tags that would be obtained from a tag dictionary or from a projection. The example is merely illustrative of an implementation of the process to obtain POS tags. The original language for which tags are sought is German 510. An English translation of the sentence is provided at 530 as is token level data 540 and type level data 550. For example, the type level data 550 may be obtained from an English tag dictionary. The alignment between the German sentence and the English sentence is shown by lines connecting the German word to its English translation. Following the steps disclosed above, the tag set for the word "the" is allowed because its type is not in the tag dictionary. Next, for a token whose type is in the tag dictionary, any tag that does not appear in the dictionary may be pruned. For example, the token level data 540 indicates that "book" may be a NOUN or ADJ. However, ADJ does not appear in the type level data 550 and may be pruned. Lastly, any projected tag that is still present after the pruning process may be accepted (i.e., has not been pruned from a prior step). Thus, the tags predicted 520 based on the model for the sample sentence 510 may be determined.

For generative models, such as HMM, it may be necessary to define only a single lattice. For an example generative model disclosed herein, this is a coupled token- and type-constrained lattice. At prediction time, in both the discriminative and the generative cases, the most likely label sequence may be determined utilizing a Viterbi decoding.

For discriminative models, such as CRF, two lattices may need to be defined: one that the model moves probability mass towards and another one defining the overall search space (or partition function). In traditional supervised learning without a dictionary, the former is a trivial lattice containing the "gold standard" (i.e., best-known) tag sequence and the latter is the set of all possible tag sequences spanning the tokens. In an example model disclosed, mass may be moved towards the coupled token- and type-constrained lattice, such that the model can freely distribute mass across all paths consistent with these constraints. The lattice defining the partition function will be the full set of possible tag sequences when no dictionary is used; when a dictionary is used it will consist of all dictionary pruned tag sequences (sans Step 3 above; the full set of possibilities shown in FIG. 4 for the running example).

Figure 6:
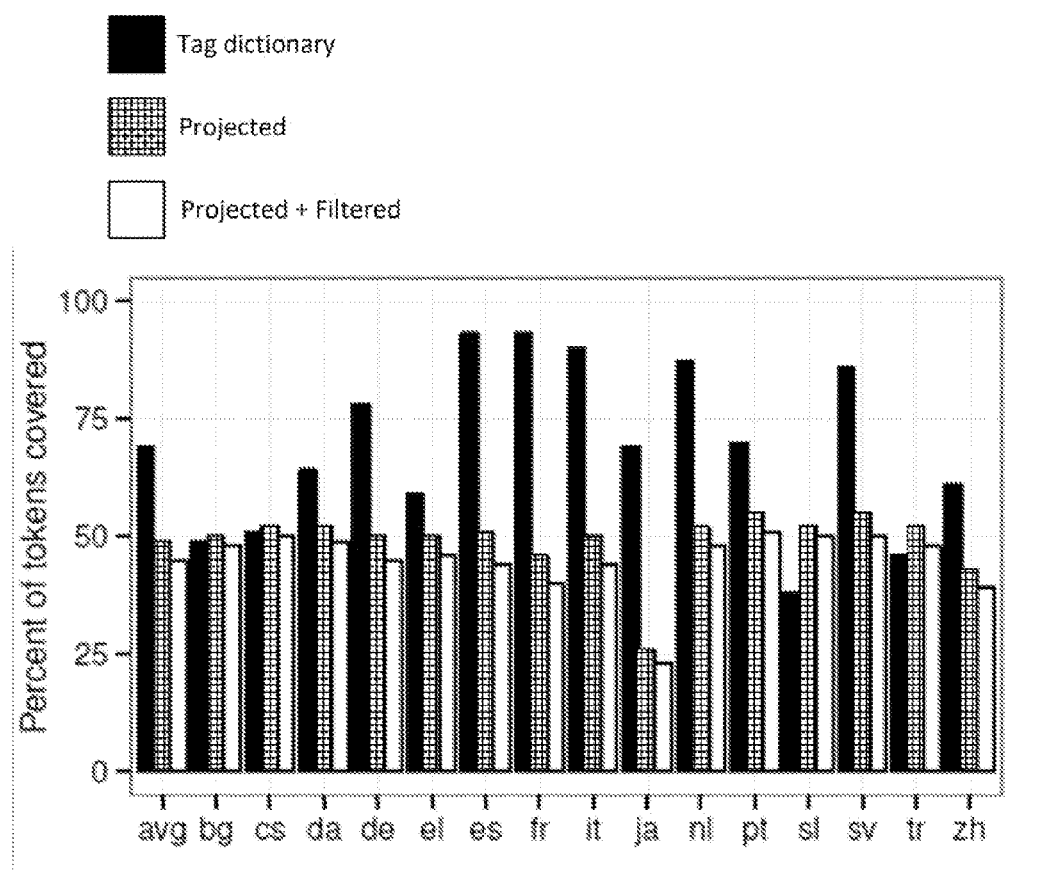
FIG. 6 shows an example of a tag dictionary and projection dictionary coverage according to an implementation disclosed herein.
Figure 7:
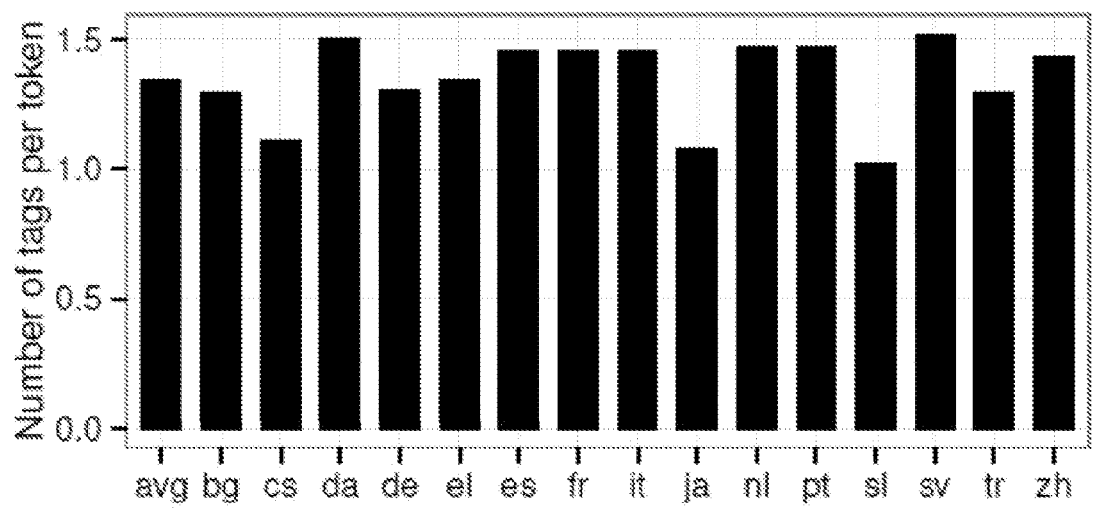
FIG. 7 shows an example of the average number of licensed tags per token on the target side of the bitext, for types in tag dictionary according to an implementation disclosed herein.

FIGS. 6 and 7 provide examples of statistics regarding the supervision coverage and remaining ambiguity. FIG. 6 shows an example of a tag dictionary and projection dictionary coverage. It shows the percentage of tokens in the target side of the bitext that are covered by the tag dictionary (black colored bars), that have a projected tag (cross-hatched bars), and that have a projected tag after intersecting the two (white bars). FIG. 6 shows that more than two thirds of all tokens in the training data may be in the tag dictionary. However, there is considerable variation between languages: Spanish has the highest coverage with over 90%, while Turkish, an agglutinative language with a vast number of word forms, has less than 50% coverage. FIG. 7 shows that there is substantial uncertainty left after pruning with the tag dictionary, since tokens are rarely fully disambiguated: 1.3 tags per token are allowed on average for types in the tag dictionary in the provided example.

FIG. 6 further shows that high-confidence alignments may be available for about half of the tokens for most languages (Japanese is a notable exception with less than 30% of the tokens covered in this example). Intersecting the dictionary tags and the projected tags (Steps 2 and 3 above) may filter out some of the potentially erroneous tags, but may preserve the majority of the projected tags. The remaining, presumably more accurate projected tags cover almost half of all tokens, greatly reducing the search space that the learner needs to explore.

Token and type constraints may be coupled and utilized to train a probabilistic training model. Let $(x=x_1x_2 \ldots x_{|x|}) \in X$ denote a sentence, where each token $x_i \in V$ is an instance of a word type from the vocabulary, V, and let $(y=y_1y_2 \ldots y_{|x|}) \in Y$ denote a tag sequence, where $y_i \in T$ is the tag assigned to token $x_i$ and T denotes the set of all possible POS tags. The lattice of all admissible tag sequences for the sentence x may be denoted by Y(x). This is the inference search space in which the tagger operates.

It may be important to constrain the size of the lattice in order to simplify learning when only incomplete supervision is available. A tag dictionary maps a word type $x_j \in V$ to a set of admissible tags $T(x_j) \subseteq T$. For word types not in the dictionary the full set of tags T may be allowed. When provided with a tag dictionary, the lattice of admissible tag sequences for a sentence x is $Y(x)=T(x_1) \times T(x_2) \times \ldots \times T(x_{|x|})$. When no tag dictionary is available, then the full lattice may be represented by $Y(x)=T^{|x|}$.

Let $\tilde{y}=(\tilde{y}_1, \ldots \tilde{y}_{|x|})$ be the projected tags for the sentence x. Note that $\{\tilde{y}\}=\emptyset$ for tokens without a projected tag. Next, a piecewise operator, $\hat{}$ may be defined that couples $\tilde{y}$ and $Y(x)$ with respect to every sentence index, which results in a token- and type-constrained lattice. The operator behaves as follows, $$\hat{T}(x_i, \tilde{y}_i) = \tilde{y}_i \frown T(x_i) = \begin{cases} \{\tilde{y}_i\} & \text{if } \tilde{y}_i \in T(x_i) \\ T(x_i) & \text{otherwise} \end{cases} \quad \text{Equation 1}$$

The token- and type-constrained lattice may be denoted as $\hat{Y}(x, \tilde{y})=\hat{T}(x_1, \tilde{y}_1) \times \hat{T}(x_2, \tilde{y}_2) \times \ldots \times \hat{T}(x_{|x|}, \tilde{y}_{|x|})$. Note that when token-level projections are not used, the dictionary-pruned lattice and the lattice with coupled constraints are identical, that is $\hat{Y}(x, \tilde{y})=Y(x)$.

A first-order HMM specifies the joint distribution of a sentence $x \in X$ and a tag-sequence $y \in Y(x)$ as:

$$p_\beta(x, y) = \prod_{i=1}^{|x|} \underbrace{p_\beta(x_i | y_i)}_{\text{emission}} \underbrace{p_\beta(y_i | y_{i-1})}_{\text{transition}} \quad \text{Equation 2}$$

A log-linear parameterization of the emission and the transition distributions may be utilized instead of a multinomial parameterization. This may allow model parameters to be shared across categorical events. The categorical emission and transition events are represented by feature vectors $\phi(x_i, y_i)$ and $\phi(x_i, y_{i-1})$. Each element of the parameter vector $\beta$ corresponds to a particular feature; the component log-linear distributions are:

$$p_\beta(x_i | y_i) = \frac{\exp(\beta^\top \phi(x_i, y_i))}{\sum_{x_i' \in V} \exp(\beta^\top \phi(x_i', y_i))} \quad \text{Equation 3}$$

and $$p_\beta(y_i | y_{i-1}) = \frac{\exp(\beta^\top \phi(y_i, y_{i-1}))}{\sum_{y_i' \in T} \exp(\beta^\top \phi(y_i', y_{i-1}))} \quad \text{Equation 4}$$

A maximum-likelihood estimation of the parameters may seek to maximize the likelihood of the observed parts of the data by obtaining the joint marginal distribution $p_\beta(x, \hat{Y}(x, \tilde{y}))$ of a sentence x, and its coupled constraints lattice $\hat{Y}(x, \tilde{y})$, which is obtained by marginalizing over all consistent outputs:

$$p_\beta(x, \hat{Y}(x,\tilde{y}))=\sum_{y \in \hat{Y}(x,\tilde{y})} p_\beta(x,y) \quad \text{Equation 5}$$

If there are no projections and no tag dictionary, then $\hat{Y}(x, \tilde{y})=T^{|x|}$, and thus $p_\beta(x, \hat{Y}(x, \tilde{y}))=p_\beta(x)$, which reduces to fully unsupervised learning. The $l_2$-regularized marginal joint log-likelihood of the constrained training data $D=\{(x^{(i)}, \tilde{y}^{(i)})\}_{i=1}^n$ is:

$$L(\beta;D)=\sum_{i=1}^n \log p_\beta(x^{(i)}, \hat{Y}(x^{(i)},\tilde{y}^{(i)}))-\gamma\|\beta\|_2^2 \quad \text{Equation 6}$$

A direct gradient approach may be applied to optimize Equation 6 with L-BFGS. $\gamma=1$ may be set and 100 iterations of L-BFGS may be run. In some configurations, the Expectation-Maximization algorithm may be employed to optimize this objective. Note that since the marginal likelihood is non-concave, a local maximum of only Equation 6 may be determined.

After estimating the model parameters $\beta$, the tag sequence $y^* \in Y(x)$ for a sentence $x \in X$ may be predicted by choosing the one with maximal joint probability:

$$y^* \leftarrow \arg\max_{y \in Y(x)} p_\beta(x,y) \quad \text{Equation 7}$$

Whereas an HMM may model the joint probability of the input $x \in X$ and output $y \in Y(x)$, using locally normalized component distributions, a CRF may model the probability of the output conditioned on the input as a globally normalized log-linear distribution:

$$p_\theta(y | x) = \frac{\exp(\theta^\top \Phi(x, y))}{\sum_{y' \in Y(x)} \exp(\theta^\top \Phi(x, y'))} \quad \text{Equation 8}$$

where $\theta$ is a parameter vector. As for the HMM, $Y(x)$ is not necessarily the full space of possible tag-sequences. It may be the dictionary-pruned lattice without the token constraints.

With a first-order Markov assumption, the feature function factors as:

$$\Phi(x,y)=\sum_{i=1}^{|x|}\phi(x,y_i,y_{i-1}) \quad \text{Equation 9}$$

This model may be more powerful than the HMM in that it can use richer feature definitions, such as joint input/transition features and features over a wider input context. A marginal conditional probability may be modeled, given by the total probability of all tag sequences consistent with the lattice $\hat{Y}(x, \tilde{y})$:

$$p_\theta(\hat{Y}(x,\tilde{y})|x)=\sum_{y \in \hat{Y}(x,\tilde{y})} p_\theta(y|x) \quad \text{Equation 10}$$

The parameters of this constrained CRF are estimated by maximizing the $l_2$-regularized marginal conditional log-likelihood of the constrained data:

$$L(\theta;D)=\sum_{i=1}^n \log p_\theta(\hat{Y}(x^{(i)},\tilde{y}^{(i)})|x^{(i)})-\gamma\|\theta\|_2^2 \quad \text{Equation 11}$$

As with Equation 6, Equation 11 may be maximized with 100 iterations of L-BFGS and setting $\gamma=1$. In contrast to the HMM, after estimating the model parameters $\theta$, the tag-sequence $y^* \in Y(x)$ for a sentence $x \in X$ is chosen as the sequence with the maximal conditional probability:

$$y^* \leftarrow \arg\max_{y \in Y(x)} p_\theta(y|x) \quad \text{Equation 12}$$

Once the POS algorithm has been trained, it may be applied to one or more words from the first language. In an implementation, a sentence in the first language may be received. The trained POS tagger algorithm may be applied to the sentence to determine a tag for the one or more words that make up the sentence. In some instances, the POS tagger algorithm may not be able to tag a particular word in the sentence. The tagged one or more words may be provided, for example, via a database or by any other user interface.

Figure 8:
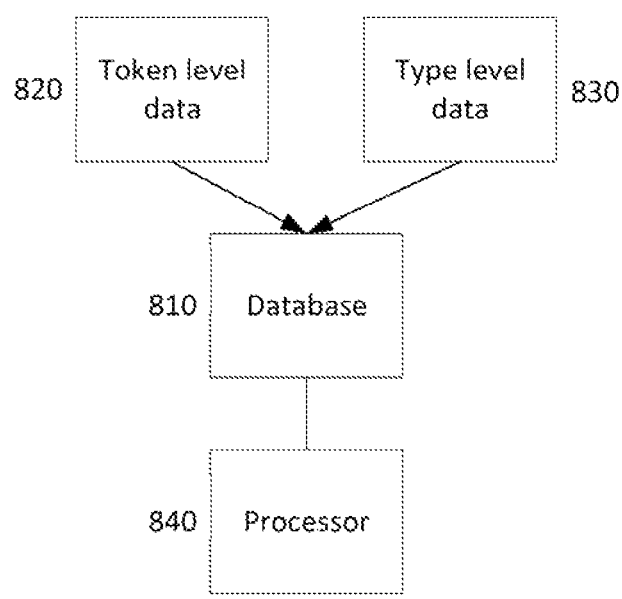
FIG. 8 shows an example system according to an implementation disclosed herein.

In an implementation, a system is disclosed. An example of the system is provided in FIG. 8 that includes a database 810 that is connected to a processor 840. The database may be used for storage of token level data 820 and/or type level data 830. The processor 840 may be configured to receive at least one test word in a first language from the database 810, for example. Token level data 820 may obtained and associated with the at least one word in the first language as described above. Type level data 830 may be obtained for the at least one test word and associated with the at least one test word in the first language. The associations may be stored, for example, as one or more database tables. The processor 840 may be configured to train a part-of-speech tagger algorithm based on the token level data 820 and the type level data 830 as disclosed above. The processor 840 may be used to apply the trained POS algorithm to a sentence that was not a component of the training set of sentences.

To examine example effects of type constraints according to implementations disclosed herein, experimentations were performed with the HMM, drawing constraints from three different dictionaries. The table shown in FIG. 9 compares the performance of the disclosed models with the best results of a first prior work ("PW1") and a second prior work ("PW2"). The "With LP" model is from PW1 in the table shown in FIG. 10 while the "SHMM-ME" model is from PW2 in FIG. 10. $y_{proj.}^{HMM}$, $y_{wik.}^{HMM}$, and $y_{union}^{HMM}$ are HMMs trained solely with type constraints derived from the projected dictionary, a tag dictionary, and the union of the projected dictionary and the tag dictionary. $y_{union}^{HMM}$+C is equivalent to $y_{union}^{HMM}$ with additional cluster features. All models are trained on the Treebank of each language, stripped of "gold labels." Results are averaged over the 8 languages described earlier, denoted as "avg(8), as well as over the full set of 15 languages, denoted as "avg."

As in previous work, training is done exclusively on the training portion of each treebank, stripped of any manual linguistic annotation. All of the parallel data were utilized to generate projected tag dictionaries: the English POS tags were projected across word alignments and aggregated to tag distributions for each word type. The distributions were then filtered with a threshold of 0.2 to remove noisy tags and to create an unweighted tag dictionary. This is referred to in FIG. 9 as $y_{proj.}^{HMM}$. Its average accuracy of 84.9% on the eight languages is higher than the 83.4% of PW1 and on a par with PW2 (84.8%). A second model $y_{wik.}^{HMM}$ draws type constraints from a tag dictionary. It slightly underperforms PW2 (83.0%) presumably. As an extension to the two models tested, the union of the projected dictionary and tag dictionary was determined to constrain an HMM. This model is referred to as $y_{union}^{HMM}$ in FIG. 9. This model performs a little worse on the eight Indo-European languages (84.5), but gives an improvement over the projected dictionary when evaluated across all 15 languages tested (80.0% vs. 78.5%).

Monolingual cluster features were added to the model with the union dictionary. This model, referred to as $y_{union}^{HMM}$+C, significantly outperforms all other type-constrained models, which may indicate the importance of word-cluster features. The same model was trained on datasets containing 500K tokens sampled from the target side of the parallel data (the model is $y_{union}^{HMM}$C+L. Training on large datasets resulted in an average accuracy of 87.2% which is comparable to the 87.3% reported for $y_{union}^{HMM}$+C in FIG. 9. This may indicate that the different source domain and amount of training data does not influence the performance of the HMM significantly.

CRF models were trained where type constraints were treated as a partially observed lattice and that used the full un-pruned lattice for computing the partition function (see Equations 8-12 and corresponding description). Similar trends were observed in these results as those for the HMM models. But, on average, accuracies were much lower compared to the type-constrained HMM models; the CRF model with the union dictionary along with cluster features achieved an average accuracy of 79.3% when trained on the same data. This may be explained by the CRF model's search space being fully unconstrained and the dictionary providing a weak set of observation constraints, which do not provide sufficient information to successfully train a discriminative model. However, as described below, coupling the dictionary constraints with token-level information solves this problem.

Token-level information was added to the above models, focusing in particular on coupled token and type constraints. Since it may not be possible to generate projected token constraints for the monolingual treebanks utilized, all models below were trained on the 500K-tokens datasets sampled from the bitext. As a baseline, the HMM and CRF models were trained using only projected token constraints, referred to as $\tilde{y}^{-HMM}$+C+L and $\tilde{y}^{-CRF}$+C+L, respectively. The table shown in FIG. 10 indicates these models underperform the type-level model $y_{union}^{HMM}$+C+L, which indicates that projected token constraints may not be reliable on their own.

FIG. 10 shows a table for tagging accuracies for models with token constraints and coupled token and type constraints. All models in FIG. 10 use cluster features ( . . . +C) and are trained on large training sets each containing 500 k tokens with (partial) token-level projections ( . . . +L). The best type-constrained model, trained on the larger datasets, $y_{union}^{HMM}$+C+L, is included for comparison. The remaining columns correspond to HMM and CRF models trained only with token constraints ($\tilde{y}$ . . . ) and with coupled token and type constraints ($\tilde{y}$ . . . ). The latter are trained using the projected dictionary (proj.), a tag dictionary (wik.), and the union of these dictionaries (union), respectively. The search spaces of the models trained with coupled constraints ($\tilde{y}$ . . . ) are each pruned with the respective tag dictionary used to derive the coupled constraints. The observed difference between $\tilde{y}_{wik.}^{CRF}$+C+L and $y_{union}^{HMM}$+C+L is statistically significant at p<0.01 (**) and p<0.015 (*) according to a paired bootstrap test. Significance was not assessed for avg or avg (8).

Models with coupled token and type constraints were examined as well (results shown in FIG. 10). These models use the same dictionaries as used earlier, but they also couple the derived type constraints with projected token constraints. Note that since only projected tags that are licensed by the dictionary were allowed (Step 3 from above), the actual token constraints used in these models vary with the different dictionaries.

FIG. 10 shows that coupled constraints may be superior to token constraints, when used both with the HMM and the CRF. However, for the HMM, coupled constraints may not provide any benefit over type constraints alone, in particular when the projected dictionary or the union dictionary is used to derive the coupled constraints, $\tilde{y}_{proj.}^{HMM}$+C+L and $\tilde{y}_{union}^{HMM}$+C+L. This may be because these dictionaries have the same bias as the token-level tag projections, so that the dictionary is unable to correct the systematic errors in the projections. Since the token constraints are stronger than the type constraints in the coupled models, this bias may have a substantial impact. With the tag dictionary utilized, the difference between the type-constrained and the coupled-constrained HMM is negligible: $y_{union}^{HMM}$+C+L and $\tilde{y}_{wik.}^{HMM}$+C+L both had an average accuracy of 82.8%.

The CRF model, on the other hand, is able to take advantage of the complementary information in the coupled constraints, provided that the dictionary is able to filter out the systematic token-level errors. With the tag dictionary that was used and projected token-level constraints, $\tilde{y}_{wik.}^{CRF}$+C+L performs better than all the remaining models, with an average accuracy of 88.8% across the eight Indo-European languages available to PW1 and PW2. Averaged over all 15 languages, its accuracy is 84.5%.

The foregoing description, for purpose of explanation, has been described with reference to specific implementations.

However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
obtaining a word in a first language;
selecting a first, token-level set of one or more parts-of-speech tags to associate with the word in the first language, comprising:
identifying a translation of the word in a second language, and
selecting, as the first, token-level set of one or more parts-of-speech tags to associate with the word in the first language, a set of one or more parts-of-speech tags that are associated with the translation of the word in the second language;
selecting a second, token-level set of one or more parts-of-speech tags to associate with the word in the first language, comprising:
when the word in the first language has no associated part-of-speech tag indicated for the word in the first language in a tag dictionary, selecting, as the second, token-level set of the one or more parts of speech tags, all of one or more of the parts-of-speech tags that (i) are in the first, token-level set of one or more parts-of-speech tags, and (ii) are associated as parts-of-speech tags with words in the tag dictionary, or
when the word in the first language has one or more associated parts-of-speech tags indicated for the word in the first language in the tag dictionary, selecting, as the second, token-level set of the one or more parts-of-speech-tags, the one or more parts-of-speech tags that (I) are in the first, token-level set of one or more parts-of-speech tags, and (II) are indicated in the tag dictionary as associated with the word in the first language; and
providing the word and the second, token-level set of the one or more parts-of-speech tags as training data for training a machine-based part-of-speech tagger.

2. The computer-implemented method of claim 1, wherein selecting a second, token-level set of one or more parts-of-speech tags to associate with the word in the first language, further comprises:
when the word in the first language has one or more associated parts-of-speech tags indicated for the word in the first language in the tag dictionary, removing, from the second, token-level set, parts-of-speech tags of the first, token-level set that are not in the tag dictionary, and
wherein providing the word and the second, token-level set of the one or more parts-of-speech tags as training data for training a machine-based part-of-speech tagger comprises:
providing the first, token-level set of one or more parts-of-speech tags as the training data for training the machine-based part-of-speech tagger.

3. The computer-implemented method of claim 1, further comprising:
generating a bidirectional word alignment based on the first, token-level set and the second, token-level set; and
determining a projection coupled to a parts-of-speech tag in the first, token-level set based on the bidirectional word alignment.

4. The computer-implemented method of claim 3, further comprising:
removing a parts-of-speech tag of the first, token-level set that is not coupled to the projection.

5. The computer-implemented method of claim 3, further comprising:
removing all parts-of-speech tags of the first, token-level set other than the parts-of-speech tag coupled to the projection.

6. The computer-implemented method of claim 1, wherein the first language is a resource-poor language and the second language is a resource-rich language.

7. The computer-implemented method of claim 1, wherein each tag in the first, token-level set is a tag indicating a particular use context of the word in the first language.

8. A non-transitory computer-readable storage medium encoded with a computer program, the computer program comprising instructions that, upon execution by a computer, cause the computer to perform operations comprising:
obtaining a word in a first language;
selecting a first, token-level set of one or more parts-of-speech tags to associate with the word in the first language, comprising:
identifying a translation of the word in a second language, and
selecting, as the first, token-level set of one or more parts-of-speech tags to associate with the word in the first language, a set of one or more parts-of-speech tags that are associated with the translation of the word in the second language;
selecting a second, token-level set of one or more parts-of-speech tags to associate with the word in the first language, comprising:
when the word in the first language has no associated part-of-speech tag indicated for the word in the first language in a tag dictionary, selecting, as the second, token-level set of the one or more parts of speech tags, all of one or more of the parts-of-speech tags that (i) are in the first, token-level set of one or more parts-of-speech tags, and (ii) are associated as parts-of-speech tags with words in the tag dictionary, or
when the word in the first language has one or more associated parts-of-speech tags indicated for the word in the first language in the tag dictionary, selecting, as the second, token-level set of the one or more parts-of-speech-tags, the one or more parts-of-speech tags that (I) are in the first, token-level set of one or more parts-of-speech tags, and (II) are indicated in the tag dictionary as associated with the word in the first language; and
providing the word and the second, token-level set of the one or more parts-of-speech tags as training data for training a machine-based part-of-speech tagger.

9. The non-transitory computer-readable storage medium of claim 8, wherein selecting a second, token-level set of one or more parts-of-speech tags to associate with the word in the first language, further comprises:
when the word in the first language has one or more associated parts-of-speech tags indicated for the word in the first language in the tag dictionary, removing, from the second, token-level set, parts-of-speech tags of the first, token-level set that are not in the tag dictionary, and wherein providing the word and the second, token-level set of the one or more parts-of-speech tags as training data for training a machine-based part-of-speech tagger comprises:
providing the first, token-level set of one or more parts-of-speech tags as the training data for training the machine-based part-of-speech tagger.

10. The non-transitory computer-readable storage medium of claim 8, wherein the operations further comprise:
generating a bidirectional word alignment based on the first, token-level set and the second, token-level set; and
determining a projection coupled to a parts-of-speech tag in the first, token-level set based on the bidirectional word alignment.

11. The non-transitory computer-readable storage medium of claim 10, wherein the operations further comprise:
removing a parts-of-speech tag of the first, token-level set that is not coupled to the projection.

12. The non-transitory computer-readable storage medium of claim 10, wherein the operations further comprise:
removing all parts-of-speech tags of the first, token-level set other than the parts-of-speech tag coupled to the projection.

13. The non-transitory computer-readable storage medium of claim 8, wherein the first language is a resource-poor language and the second language is a resource-rich language.

14. The non-transitory computer-readable storage medium of claim 8, wherein each tag in the first, token-level set is a tag indicating a particular use context of the word in the first language.

15. A system comprising:
one or more processors and one or more computer storage media storing instructions that are operable, when executed by the one or more processors, to cause the one or more processors to perform operations comprising:
obtaining a word in a first language;
selecting a first, token-level set of one or more parts-of-speech tags to associate with the word in the first language, comprising:
identifying a translation of the word in a second language, and
selecting, as the first, token-level set of one or more parts-of-speech tags to associate with the word in the first language, a set of one or more parts-of-speech tags that are associated with the translation of the word in the second language;
selecting a second, token-level set of one or more parts-of-speech tags to associate with the word in the first language, comprising:
when the word in the first language has no associated part-of-speech tag indicated for the word in the first language in a tag dictionary, selecting, as the second, token-level set of the one or more parts of speech tags, all of one or more of the parts-of-speech tags that (i) are in the first, token-level set of one or more parts-of-speech tags, and (ii) are associated as parts-of-speech tags with words in the tag dictionary, or
when the word in the first language has one or more associated parts-of-speech tags indicated for the word in the first language in the tag dictionary, selecting, as the second, token-level set of the one or more parts-of-speech-tags, the one or more parts-of-speech tags that (I) are in the first, token-level set of one or more parts-of-speech tags, and (II) are indicated in the tag dictionary as associated with the word in the first language; and
providing the word and the second, token-level set of the one or more parts-of-speech tags as training data for training a machine-based part-of-speech tagger.

16. The system of claim 15, wherein selecting a second, token-level set of one or more parts-of-speech tags to associate with the word in the first language, further comprises:
when the word in the first language has one or more associated parts-of-speech tags indicated for the word in the first language in the tag dictionary, removing, from the second, token-level set, parts-of-speech tags of the first, token-level set that are not in the tag dictionary, and
wherein providing the word and the second, token-level set of the one or more parts-of-speech tags as training data for training a machine-based part-of-speech tagger comprises:
providing the first, token-level set of one or more parts-of-speech tags as the training data for training the machine-based part-of-speech tagger.

17. The system of claim 15, wherein the operations further comprise:
generating a bidirectional word alignment based on the first, token-level set and the second, token-level set; and
determining a projection coupled to a parts-of-speech tag in the first, token-level set based on the bidirectional word alignment.

18. The system of claim 17, wherein the operations further comprise:
removing a parts-of-speech tag of the first, token-level set that is not coupled to the projection.

19. The system of claim 17, wherein the operations further comprise:
removing all parts-of-speech tags of the first, token-level set other than the parts-of-speech tag coupled to the projection.

20. The system of claim 15, wherein the first language is a resource-poor language and the second language is a resource-rich language, and
wherein each tag in the first, token-level set is a tag indicating a particular use context of the word in the first language.

* * * * *